US010963995B2

(12) United States Patent
Kim et al.

(10) Patent No.: US 10,963,995 B2
(45) Date of Patent: Mar. 30, 2021

(54) IMAGE PROCESSING APPARATUS AND IMAGE PROCESSING METHOD THEREOF

(71) Applicant: SAMSUNG ELECTRONICS CO., LTD., Suwon-si (KR)

(72) Inventors: Sang-hun Kim, Suwon-si (KR); Seung-ho Park, Suwon-si (KR); Dong-yoon Kim, Suwon-si (KR); Young-su Moon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 103 days.

(21) Appl. No.: 16/165,183

(22) Filed: Oct. 19, 2018

(65) Prior Publication Data
US 2019/0251673 A1 Aug. 15, 2019

Related U.S. Application Data

(60) Provisional application No. 62/629,276, filed on Feb. 12, 2018.

(30) Foreign Application Priority Data

Jul. 19, 2018 (KR) .................. 10-2018-0084294

(51) Int. Cl.
G06T 5/00 (2006.01)

(52) U.S. Cl.
CPC .............. *G06T 5/004* (2013.01); *G06T 5/002* (2013.01); *G06T 5/008* (2013.01); *G06T 2207/20192* (2013.01); *G06T 2207/20208* (2013.01)

(58) Field of Classification Search
CPC ......... G06T 5/004; G06T 5/002; G06T 5/008; G06T 2207/20208; G06T 2207/20192;
(Continued)

(56) References Cited

U.S. PATENT DOCUMENTS 6,633,342 B2 10/2003 Kim
7,538,822 B2 5/2009 Lee et al.
(Continued)

FOREIGN PATENT DOCUMENTS

KR 10-2017-0087731 7/2017

OTHER PUBLICATIONS

Buades et al., "A non-local algorithm for image denoising," in Proc. IEEE Int. Conf. Comput. Vis., pp. 60-65, 2005.
(Continued)

Primary Examiner — Nimesh Patel
(74) Attorney, Agent, or Firm — Nixon & Vanderhye P.C.

(57) ABSTRACT

An image processing apparatus is provided. The image processing apparatus according to an example embodiment includes an input unit comprising input circuitry, and a processor configured to: perform a noise reduction process on an image input through the input unit, identify a first pixel block based on an object pixel in the input image, identify a second pixel block based on the object pixel in a denoised image, obtain a gain value based on a pixel value included in the first pixel block and a pixel value included in the second pixel block, and perform an enhancement process on the denoised image by applying the obtained gain value to the second pixel block.

18 Claims, 26 Drawing Sheets

(58) Field of Classification Search
CPC ............. G06T 2207/20021; G06T 1/20; G06T 2207/10024; G06T 5/20; G06T 3/4015; G06T 5/001; G06T 5/50; G06T 2207/20182; G06T 5/003; G06T 5/009; G06T 7/90; G06T 2200/28; G06T 2207/10016; G06T 5/005; G06T 5/006; G06T 2207/30201; G06T 5/00; G06T 2207/10004; G06T 7/11; G06T 11/00; G06T 2207/20032; G06T 2207/20084; H04N 9/045; H04N 9/735; H04N 5/365; H04N 5/142; H04N 5/23254; H04N 5/357; H04N 9/73; H04N 5/23212; H04N 5/2175; H04N 5/2258; H04N 5/23238; G06K 9/38; G06K 9/00604; G06K 9/2027; G06K 9/00221; G06K 9/40; G06K 9/00234; G06K 9/00248; G06K 9/00281; G06K 9/6262; G06K 9/00302; G06K 9/6277; G06K 9/00362; G06K 9/00671; G06K 9/4604; G06K 9/6202; G06K 9/6267; G06K 2209/05; G06K 9/00201; G06K 9/00711; G06K 9/00013; G06K 9/00597; A61B 3/113; G06F 16/434; G06F 16/498; G06F 3/011; G06F 9/30032; G06F 3/017; G06F 3/04845; G06F 3/013; G06F 9/3001; G06F 21/32; G03B 13/18; G03B 13/36; G03B 2205/0007; G03B 33/16; G03B 35/08; G03B 35/18; G03B 37/00; G03B 37/04; G03B 3/00; G03B 3/10; G03B 5/00; G06N 20/20; G06N 3/0454; G06N 5/003; G06N 20/10; G06N 3/0445; G06N 3/08; G06N 20/00; G06N 3/02

See application file for complete search history.

(56) References Cited

U.S. PATENT DOCUMENTS

| | | | |
|---|---|---|---|
| 8,139,883 B2 | 3/2012 | Zhang et al. | |
| 8,582,910 B2 | 11/2013 | Zhang et al. | |
| 8,938,110 B2 | 1/2015 | Goshen et al. | |
| 2004/0047514 A1 | 3/2004 | Gallagher et al. | |
| 2010/0165195 A1* | 7/2010 | Ratner | G06K 9/2027 348/489 |
| 2012/0081553 A1* | 4/2012 | Cote | H04N 9/045 348/207.1 |
| 2014/0079319 A1 | 3/2014 | Lin et al. | |
| 2014/0193032 A1* | 7/2014 | Zhang | G06T 5/003 382/103 |
| 2015/0016721 A1* | 1/2015 | Min | G06K 9/40 382/167 |
| 2015/0206285 A1 | 7/2015 | Pajak et al. | |
| 2016/0119503 A1 | 4/2016 | Yamada | |
| 2016/0253787 A1* | 9/2016 | Chen | G06T 5/002 382/275 |
| 2016/0321523 A1* | 11/2016 | Sen | G06T 5/002 |
| 2017/0372456 A1 | 12/2017 | Lee et al. | |
| 2018/0012340 A1 | 1/2018 | Park et al. | |

OTHER PUBLICATIONS

Dabov et al., "Image denoising by sparse 3-D transform-domain collaborative filtering," IEEE Trans. Image Process., vol. 16, No. 8, pp. 2080-2095, Aug. 2007.

Zhang et al., "CONCOLOR: Constrained non-convex low-rank model for image deblocking," IEEE Trans. Image Process., vol. 25, No. 3, pp. 1246-1259, Mar. 2016.

International Search Report and Written Opinion dated May 20, 2019, issued in International Application No. PCT/KR2019/001649.

* cited by examiner

SIMILAR PATCH GROUP

FIG. 14

| Test image | Barbara | Butterfly | Camera | Forem | House | Leaves | Lena | Parrots | Peppers |
|---|---|---|---|---|---|---|---|---|---|
| Size | $256^2$ | $256^2$ | $256^2$ | CIF | $256^2$ | $256^2$ | $512^2$ | $256^2$ | $512^2$ |
| | \multicolumn{9}{c}{JPEG QF = 10} |
| JPEG | 26.29 | 25.24 | 26.47 | 29.11 | 30.55 | 25.39 | 30.41 | 28.95 | 30.13 |
| | 0.7901 | 0.8235 | 0.7965 | 0.8084 | 0.8183 | 0.8609 | 0.8183 | 0.8336 | 0.7839 |
| CONCOLOR | 28.50 | 27.90 | 27.72 | 31.46 | 33.04 | 28.20 | 32.19 | 30.66 | 31.94 |
| | 0.8524 | 0.9142 | 0.8401 | 0.8746 | 0.8609 | 0.9406 | 0.8661 | 0.8842 | 0.8358 |
| CONCOLOR +ESR | 28.48 | 28.27 | 27.87 | 31.70 | 33.17 | 28.62 | 32.27 | 30.78 | 32.07 |
| | 0.8532 | 0.9174 | 0.8417 | 0.8759 | 0.8616 | 0.9444 | 0.8667 | 0.8848 | 0.8364 |
| | \multicolumn{9}{c}{JPEG QF = 20} |
| JPEG | 29.36 | 27.55 | 28.59 | 31.51 | 33.02 | 28.05 | 32.96 | 31.56 | 32.43 |
| | 0.8831 | 0.8816 | 0.8585 | 0.8684 | 0.8613 | 0.9104 | 0.8735 | 0.8918 | 0.8354 |
| CONCOLOR | 32.14 | 30.05 | 29.78 | 33.45 | 34.87 | 31.00 | 34.28 | 32.98 | 33.72 |
| | 0.9248 | 0.9419 | 0.8830 | 0.9052 | 0.8813 | 0.9658 | 0.8954 | 0.9177 | 0.8587 |
| CONCOLOR +ESR | 31.98 | 30.45 | 29.96 | 33.71 | 34.95 | 31.46 | 34.34 | 33.11 | 33.82 |
| | 0.9250 | 0.9439 | 0.8841 | 0.9063 | 0.8816 | 0.9680 | 0.8957 | 0.9181 | 0.8591 |

IMAGE PROCESSING APPARATUS AND IMAGE PROCESSING METHOD THEREOF

CROSS-REFERENCE TO RELATED APPLICATIONS

This application is based on and claims priority under 35 U.S.C. § 119 to U.S. Provisional Patent Application No. 62/629,276, filed on Feb. 12, 2018, in the United States Patent and Trademark Office, and Korean Patent Application No. 10-2018-0084294, filed on Jul. 19, 2018, in the Korean Intellectual Property Office, the disclosure of which is incorporated by reference herein in its entirety.

BACKGROUND

1. Field

The present disclosure relates generally to an image processing apparatus and an image processing method, and for example, to an image processing apparatus for performing an enhancement process on an input image and an image processing method thereof.

2. Description of Related Art

With the development of electronic technology, various types of electronic apparatuses have been developed and widely used. Particularly, a display apparatus used in a variety of places such as home, office, and public place has been developed for years.

Recently, high-resolution image service and real-time streaming service are in high demand. However, loss compression is inevitable for transmitting a high-resolution image and a streaming image, which results in image quality deterioration.

SUMMARY

An aspect of various example embodiments relates to providing an image processing apparatus for improving edge sharpness and local contrast reduced by image compression, noise reduction processing, etc. and an image processing method thereof.

According to an example embodiment, an image processing apparatus is provided, the image processing apparatus including an input unit comprising input circuitry, and a processor configured to: perform a noise reduction process on an image input through the input unit, identify a first pixel block based on an object pixel in the input image, identify a second pixel block based on the object pixel in a denoised image obtained by the noise reduction process, obtain a gain value based on a pixel value included in the first pixel block and a pixel value included in the second pixel block, and perform an enhancement process on the denoised image by applying the obtained gain value to the second pixel block.

The processor may be further configured to obtain the gain value based on a variance for the pixel value included in the first pixel block, and a variance for the pixel value included in the second pixel block.

The processor may be further configured to obtain the gain value based on a gradient for the pixel value included in the first pixel block, and a gradient for the pixel value included in the second pixel block.

The processor may be further configured to obtain the gain value based on a variance for the pixel value included in the first pixel block, and a variance for the pixel value included in the second pixel block, based on the first pixel block being included in a texture region of the input image, and to obtain the gain value based on a gradient for the pixel value included in the first pixel block and a gradient for the pixel value included in the second pixel block based on the first pixel block being included in an edge region of the input image.

The processor may be further configured to perform an enhancement process on the denoised image based on the pixel value included in the second pixel block, a first mean value for the pixel value included in the first pixel block, a second mean value for the pixel value included in the second pixel block, and the gain value.

The processor may be further configured to perform an enhancement process on the denoised image by subtracting the second mean value from each pixel value included in the second pixel block, multiplying by the gain value, and adding the first mean value.

The processor may be further configured to perform an enhancement process on the denoised image by obtaining a pixel value of the object pixel from the second pixel block, subtracting the second mean value from the obtained pixel value, multiplying by the gain value, and adding the first mean value.

The processor may be further configured to perform the enhancement process by applying at least one of unsharp masking and pixel value stretching.

The image processing apparatus may further include a display, wherein the processor is further configured to control the display to display the enhancement processed image.

According to an example embodiment, a method for providing an image processing method for an image processing apparatus is provided, the method including performing a noise reduction process on an input image, identifying a first pixel block based on an object pixel in the input image, identifying a second pixel block based on the object pixel in a denoised image obtained by the noise reduction process, obtaining a gain value based on a pixel value included in the first pixel block and a pixel value included in the second pixel block, and performing an enhancement process on the denoised image by applying the obtained gain value to the second pixel block.

The obtaining of the gain value may include obtaining the gain value based on a variance for the pixel value included in the first pixel block, and a variance for the pixel value included in the second pixel block.

The obtaining of the gain value may include obtaining the gain value based on a gradient for the pixel value included in the first pixel block, and a gradient for the pixel value included in the second pixel block.

The obtaining of the gain value may include, obtaining the gain value based on a variance for the pixel value included in the first pixel block, and a variance for the pixel value included in the second pixel block based on the first pixel block being included in a texture region of the input image, and obtaining the gain value based on a gradient for the pixel value included in the first pixel block, and a gradient for the pixel value included in the second pixel block based on the first pixel block being included in an edge region of the input image.

The performing of the enhancement process may include performing an enhancement process on the denoised image based on the pixel value included in the second pixel block, a first mean value for the pixel value included in the first pixel block, a second mean value for the pixel value included in the second pixel block, and the gain value.

The performing of the enhancement process may include performing an enhancement process on the denoised image by subtracting the second mean value from each pixel value included in the second pixel block, multiplying by the gain value, and adding the first mean value.

The performing of the enhancement process may include performing an enhancement process on the denoised image by obtaining a pixel value of the object pixel of the second pixel block, subtracting the second mean value from the obtained pixel value, multiplying by the gain value, and adding the first mean value.

The performing of the enhancement process may include performing the enhancement process by applying at least one of unsharp masking and pixel value stretching.

The method may further include displaying the enhancement processed image.

According to an example embodiment, a non-transitory computer readable recording medium that stores a computer command which, when executed by a processor of the electronic apparatus, causes the electronic apparatus to perform operations, wherein the operations include performing a noise reduction process on an input image, identifying a first pixel block based on an object pixel in the input image, identifying a second pixel block based on the object pixel in a denoised image, obtaining a gain value based on a pixel value included in the first pixel block and a pixel value included in the second pixel value, and performing an enhancement process on the denoised image by applying the obtained gain value to the second pixel block.

According to the above-described various example embodiments, edge sharpness and/or local contrast reduced by image compression, noise reduction processing, etc. may be improved.

BRIEF DESCRIPTION OF THE DRAWINGS

The above and other aspects, features and attendant advantages of various example embodiments of the present disclosure will be more apparent and readily appreciated from the following detailed description, taken in conjunction with the accompanying drawings, in which like reference numerals refer to like elements, and wherein:

FIG. 14 is a table illustrating a quantitative effect according to another embodiment of the present disclosure;

DETAILED DESCRIPTION

Figure 1:
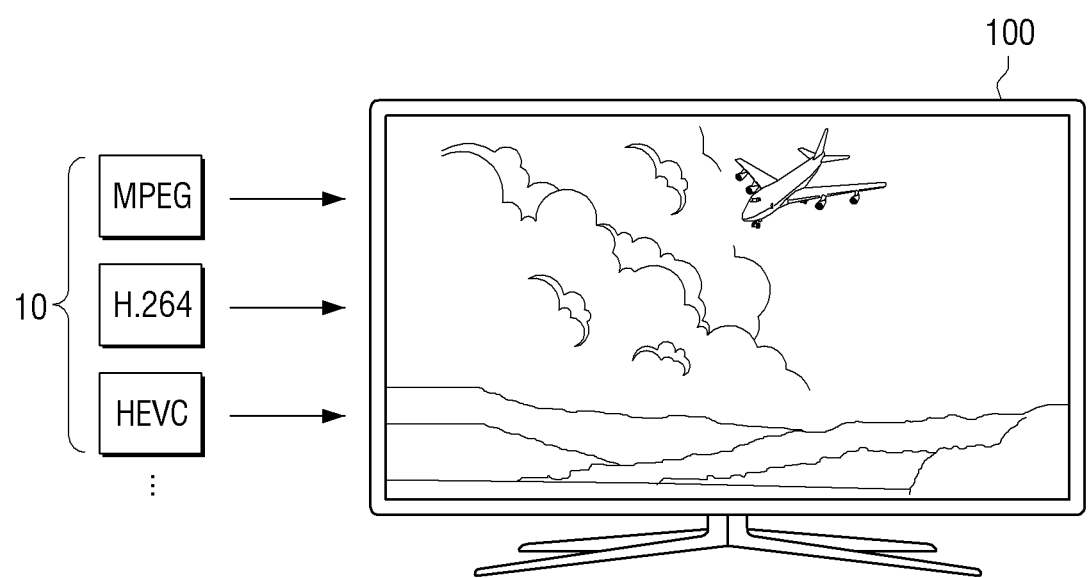
FIG. 1 is a diagram illustrating an example embodiment of an image processing apparatus according to an embodiment of the present disclosure.

Hereinafter, the present disclosure will be described in greater detailed below with reference to drawings.

The terms used in this disclosure will be briefly described, and the present disclosure will be described in greater detail.

All the terms used in this disclosure including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may be understood to have the meaning defined herein and, unless otherwise specified, may be understood based on the entire contents of this disclosure and common technical knowledge in the art.

The disclosure is not limited to any particular example embodiment disclosed below and may be implemented in various forms and the scope of the disclosure is not limited to the following example embodiments. In addition, all changes or modifications derived from the meaning and scope of the claims and their equivalents should be understood as being included within the scope of the present disclosure. In the following description, the configuration which is publicly known but irrelevant to the gist of the present disclosure may be omitted.

The terms such as "first," "second," and so on may be used to describe a variety of elements, but the elements should not be limited by these terms. The terms are used simply to distinguish one element from other elements.

The singular expression also includes the plural meaning as long as it does not conflict with the context. In this disclosure, terms such as 'include' and 'have/has' should be understood as designating that there are such features, numbers, operations, elements, components or a combination thereof in the disclosure, not to exclude the existence or possibility of adding one or more of other features, numbers, operations, elements, components or a combination thereof.

The phrase "at least one of A and B" includes "A alone", "B alone", and "both A and B".

In an example embodiment, 'a module', 'a unit', or 'a part' perform at least one function or operation, and may be realized as hardware, such as a processor or integrated circuit, software that is executed by a processor, or any combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, various example embodiments of the present disclosure will be described in greater detail with reference to the accompanying drawings so that those skilled in the art can easily understand the present disclosure. However, the present disclosure may be embodied in many different forms and is not limited to the embodiments described herein. In order to clearly illustrate the present disclosure in the drawings, some of the elements that are not essential to the complete understanding of the disclosure may be omitted for clarity, and like reference numerals refer to like elements throughout the disclosure.

FIG. 1 is a diagram illustrating an example embodiment of an image processing apparatus according to an embodiment of the present disclosure.

Referring to FIG. 1, an image processing apparatus 100 may be implemented as a TV or a set-top box, but is not limited thereto. The image processing apparatus 100 could be any type of apparatus as long as it has an image processing and/or display function such as, for example, and without limitation, a smart phone, a tablet PC, a notebook PC, head mounted display (HMD), near eye display (NED), large format display (LFD), digital signage, digital information display (DID), video wall, projector display, camera, etc.

The image processing apparatus 100 may receive various compressed images or images having various resolutions. For example, the image processing apparatus 100 may receive an image which is compressed by such as a moving picture experts group (MPEG) (e.g., MP2, MP4, MP7, etc.), a joint photographic coding experts group (JPEG), an advanced video coding (AVC), H.264, H.265, and high efficiency video codec (HEVC). The image processing apparatus 100 may receive any of Standard Definition (SD), High Definition (HD), Full HD, and/or Ultra HD images, or the like.

According to an embodiment, an input image may include noise caused by compression. For example, block-discrete cosine transform (BDCT) may be an effective compression method, which is widely used, but it may create compression noise such as blocky, ringing, mosquito, stair case, etc. and cause blurring, weak texture loss, etc. For example, noise such as blocky may cause discontinuity at the boundary of a block used for compression. In addition, ringing, mosquito noise, blurring, etc. may be generated near the edge due to quantization of a high frequency component.

Accordingly, a process for eliminating and/or reducing compressing noise is desired for receiving an input image, but even during a process of eliminating compression noise, the edge may be blurred and the local contrast may be reduced. Accordingly, an enhancement process for restoring the edge sharpness, the local contrast, etc. may be further required after compression noise reduction.

However, image distortion or side effects such as undershoot or overshoot may occur if the edge sharpness is excessively increased. On the other hand, if the edge sharpness is not sufficiently restored, the sharpness of a high quality level may not be obtained. Accordingly, it is important to calculate (determine) an optimal gain for restoring the edge sharpness, the local contrast, etc.

Hereinafter, various example embodiments for improving the edge sharpness blurred in the process of compression or reduction of noise and the local contrast will be described.

Figure 2:
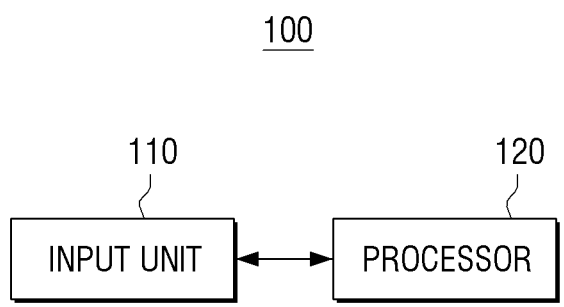
FIG. 2 is a block diagram illustrating an example configuration of an image processing apparatus according to an embodiment of the present disclosure.

FIG. 2 is a block diagram illustrating an example configuration of an image processing apparatus according to an embodiment of the present disclosure.

Referring to FIG. 2 an image processing apparatus 100 may include an input unit (e.g., including input circuitry) 110 and a processor (e.g., including processing circuitry) 120.

The input unit 110 may include various input circuitry and receive various types of contents. For example, the input unit 110 may receive an image signal in a streaming or downloading manner from an external device (e.g., a source device), an external storage device (e.g., a USB device), an external server (e.g., a web-hard), etc. via a communication method such as AP-based Wi-Fi (Wi-Fi, Wireless LAN network), Bluetooth, Zigbee, wired/wireless Local Area Network (LAN), WAN, Ethernet, IEEE 1394, HDMI, USB, MHL, AES/EBU, optical, coaxial, or the like. The image signal may be a digital signal, but is not limited thereto.

The processor 120 may include various processing circuitry and control the overall operation of the image processing apparatus 100.

According to an embodiment, the processor 120 may, for example, and without limitation, be implemented as a digital signal processor (DSP), a microprocessor, a time controller (TCON), or the like, for processing digital image signals. However, the present disclosure is not limited thereto but may include, for example, and without limitation, one or more of a dedicated processor, a central processing unit (CPU), a microcontroller unit (MCU), a micro processing unit (MPU), a controller, an application processor (AP), a communication processor (CP), an ARM processor, or the like. The processor 140 may also be implemented, for example, and without limitation, as system on chip (SoC), or large scale integration (LSI), may be implemented in the form of Field Programmable Gate Array (FPGA), or the like.

<Noise Reduction Process>

The processor 120 may perform a noise reduction process (or, a noise reduction process) on an image input through the input unit 110. Typically, noise occurs in the process of compressing and transmitting an image. The noise reduction process is provided to ensure image quality of an image that can be deteriorated by noise and prevent and/or reduce image processing effects such as scaling, characteristic extraction, resolution processing, etc. from being deteriorated According to an embodiment, the processor 120 may perform the noise reduction process in a manner using non-local filtering and self-similarity. Most images may have self-similarity which can be the basis of Fractal theory. In other words, on the assumption that an image includes one region and other regions similar to the one region, after how similar one region is to other regions in the image is measured, and the noise reduction process may be performed based on a pixel area with high similarity.

For example, it is assumed that the processor 120 obtains a predetermined pixel area (or a pixel block), for example, a predetermined patch (hereinafter, referred to as a present patch) in the image, and patches similar to the present patch are present in the image. By collecting the patches similar to the present patch, a similar component may be regarded as a structure component, and a non-similar component may be regarded as a noise component. In other words, the processor 120 may eliminate and/or reduce noise of the image by remaining signals with high similarity between patches, and eliminating and/or reducing signals with low similarity. By doing so, blurring of the structure component may be reduced and noise may be effectively eliminated and/or reduced compared to a smoothing filter by low pass filtering.

Figure 3:
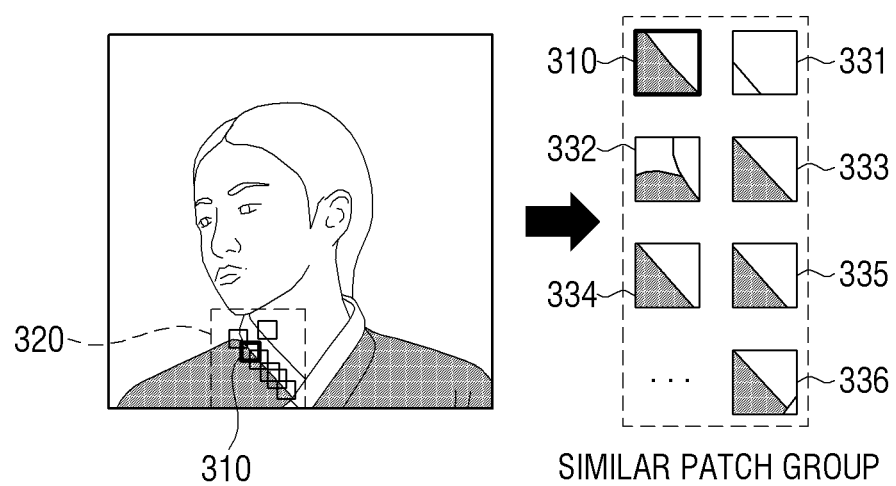
FIG. 3 is a diagram illustrating a method for finding a similar patch according to an embodiment of the present disclosure.

FIG. 3 is a diagram illustrating a method for finding a similar patch according to an embodiment of the present disclosure.

Referring to FIG. 3, similar patches may be found based on a present patch 310 in a predetermined area 320. As a cost function for determining the similarity, mean square error (MSE), sum of absolute difference (SAD), median absolute deviation (MAD) and correlation, or the like, may be used, but is not limited thereto. For example, when using the MSE, it is possible to calculate the MSE of the obtained patches of the compressed image, find a patch with high similarity in view of MSE, that is, a patch having a small MSE difference, and obtain similar patches.

When similar patches 331, 332, 333, 334, 335 and 336 are obtained, compression noise may be eliminated and/or reduced using the self-similarity of similar patches 331, 332, 333, 334, 335 and 336.

In order to eliminate and/or reduce noise using similar patches, various methods introduced in NLM (A. Buades, B. Coll, and J M Morel, "A non-local algorithm for image denoising," in Proc., pp. 60-65, 2005.), BM3D (K. Dabov, A. Foi, V. Katkovnik, and K. Egiazarian, "Image denoising by sparse 3-D transform-domain collaborative filtering, 20, 2095, August 2007), CONCOLOR (J. Zhang, R. Xiong, C. Zhao, Y. Zhang, S. Ma, and W. Gao, "CONCOLOR: Constrained non-convex low-rank model for image deblocking, & quot; IEEE Trans. Image Process., Vol. 25, no. 3, pp. 1246-1259, 2016) may, for example, and without limitation, be used.

For example, when using CONCOLOR, division into a similar component and a non-similar component may be made using singular value decomposition (SVD). The CONCOLOR may eliminate and/or reduce noise by maintaining the similar component corresponding to the structure component of the patch and reducing a signal of the non-similar component, which is noise. Meanwhile, according to BM3D, division into a similar component and a non-similar component between patches may be made by performing 3D-DCT of the patches, but by using the SVD, the similar component may be distinguished from the non-similar component more accurately compared to the case of using the 3D-DCT.

<Gain Acquisition and Enhancement Processing According to an Embodiment>

The processor 120 may obtain a gain for performing an enhancement process based on an image obtained by the noise reduction process (referred to herein as "a denoised image") and the input image.

According to an embodiment, the processor 120 may calculate a gain for restoring the blurred edge and the lowered sharpness caused by the noise reduction process.

In this case, it is assumed that noise power nearby the edge is not greater than power of the edge. Such assumption is due to the generation process of compression noise. In other words, this is because compression noise that is generated in the process of performing discrete cosine transform (DCT) in a patch unit for expressing the edge during the compression, and performing quantization of DCT coefficients. It is further assumed that a noise reduction technique using non-local filtering fails to render texture a perfect flat surface. The fully flattened area of the denoised image may be the case where an input image is already a complete flat region, or nearly flat, so that a user cannot perceive the texture.

Based on the above assumptions, a method for determining an optimal and/or improved gain according to an embodiment of the present disclosure may be performed in such a manner that a metric to be preserved according to local characteristic of a compressed image is preserved even after noise is eliminated and/or reduced. For example, a gain may be calculated by way of calculating a metric such as mean, variance, gradient, etc. of the input image and preserving the metric.

For example, the processor 120 may identify a first pixel block based on an object pixel of the input image, and identify a second pixel block based on the object pixel in the denoised image. According to an embodiment, the processor 120 may obtain a first pixel block and a second pixel block of a predetermined size including neighboring pixels based on the object pixel. The predetermined size could vary such as 3*3, 5*5, etc. but for ease of explanation, an example 3*3 pixel block is obtained. For example, the pixel block may be embodied as a patch.

The processor 120 may obtain a gain value based on a pixel value included in the first pixel block and a pixel value included in the second pixel block.

According to an embodiment, the processor 120 may calculate mean and variance from a first patch, and calculate mean and variance from a second patch. The mean and the variance of the first patch may be $I_{input}^{mean}(\overline{x}, \overline{y})$ and $I_{input}^{var}(\overline{x}, \overline{y})$, respectively, and the mean and the variance of the second patch may be $I_{denoised}^{mean}(\overline{x}, \overline{y})$ and $I_{denoised}^{var}(\overline{x}, \overline{y})$, respectively.

The processor 120 may obtain a gain g based on the variance $I_{input}^{var}(\overline{x}, \overline{y})$ of the first patch and the variance $I_{denoised}^{var}(\overline{x}, \overline{y})$ of the second patch. The variance may be an average of (deviation)$^2$, and the deviation may be a difference between an average of the pixel values included in the first patch (or, the second patch) and each pixel value.

According to another example, the processor 120 may calculate the maximum gradient from the first patch and the maximum gradient from the second patch. The maximum gradient of the first patch and the maximum gradient of the second patch may be $I_{input}^{max.grad}(\overline{x}, \overline{y})$ and $I_{denoised}^{max.grad}(\overline{x}, \overline{y})$, respectively. The gradient may be a difference between values of neighboring pixels, and the maximum gradient may be a greatest value of pixel value differences between neighboring pixels included in the first patch (or, the second patch).

Meanwhile, it would be effective to calculate a gain based on the different metric according to the local characteristic of an image. For example, the image may be divided into a flat region, an edge region, and a texture region.

In the edge region, preserving the maximum gradient of the edge may effectively prevent and/or reduce blurring. In a narrow region such as a patch, there is no pixel with a maximum gradient that is greater than the edge, so no side effect such as overshoot may occur. Unlike the edge region, for the texture region, it would be effective to preserve the variance since the signals of similar size are complexly distributed. However, the flat region may not be subjected to an additional restoration process.

Accordingly, in the texture region, a gain may be obtained based on a variance, and in the edge region, a gain may be obtained based on the maximum gradient. In the edge region, $I_{input}^{max.grad}(\overline{x}, \overline{y})/I_{denoised}^{max.grad}(\overline{x}, \overline{y})$ may be an optimal grain for restoring the sharpness, and in the texture region, $$\sqrt{I_{input}^{var}(\overline{x}, \overline{y})/I_{denoised}^{var}(\overline{x}, \overline{y})}$$

may be an optimal gain for restoring the sharpness.

The processor 120 may perform an enhancement process on the denoised image by applying the obtained gain value to the second pixel block. The processor 120 may obtain an output pixel value of an object pixel by applying the obtained gain value to the object pixel included in the second pixel block. In the similar manner, the processor 120 may obtain an output image by performing a process on all pixel values of the input image.

The processor 120 may obtain a gain on a predetermined pixel block basis (e.g., a predetermined patch), and apply the obtained gain to a pixel value of the object pixel included in the second pixel block to obtain the stretched object pixel value.

For example, the processor 120 may obtain the stretched object pixel value based on a pixel value included in the second pixel bock, a mean value of a pixel value included in the first pixel block (hereinafter, a first mean value), a mean value of a pixel value in the second pixel block (hereinafter, a second mean value), and the obtained gain value.

According to an embodiment, the processor 120 may subtract the first mean value from the pixel value in the second pixel block, that is, the second patch, multiply the obtained pixel value by the gain value, and add the second mean value, to thereby obtain the enhancement processed object pixel value. Accordingly, the patch may maintain the average of the first pixel block consisting of the input pixel values as well as the characteristic metric of the input image.

Figure 4A:
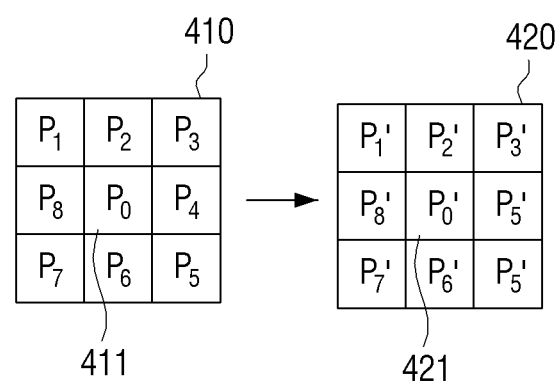
FIGS. 4A, 4B and 4C are diagrams illustrating a pixel value stretching method according to an embodiment of the present disclosure.
Figure 4B:
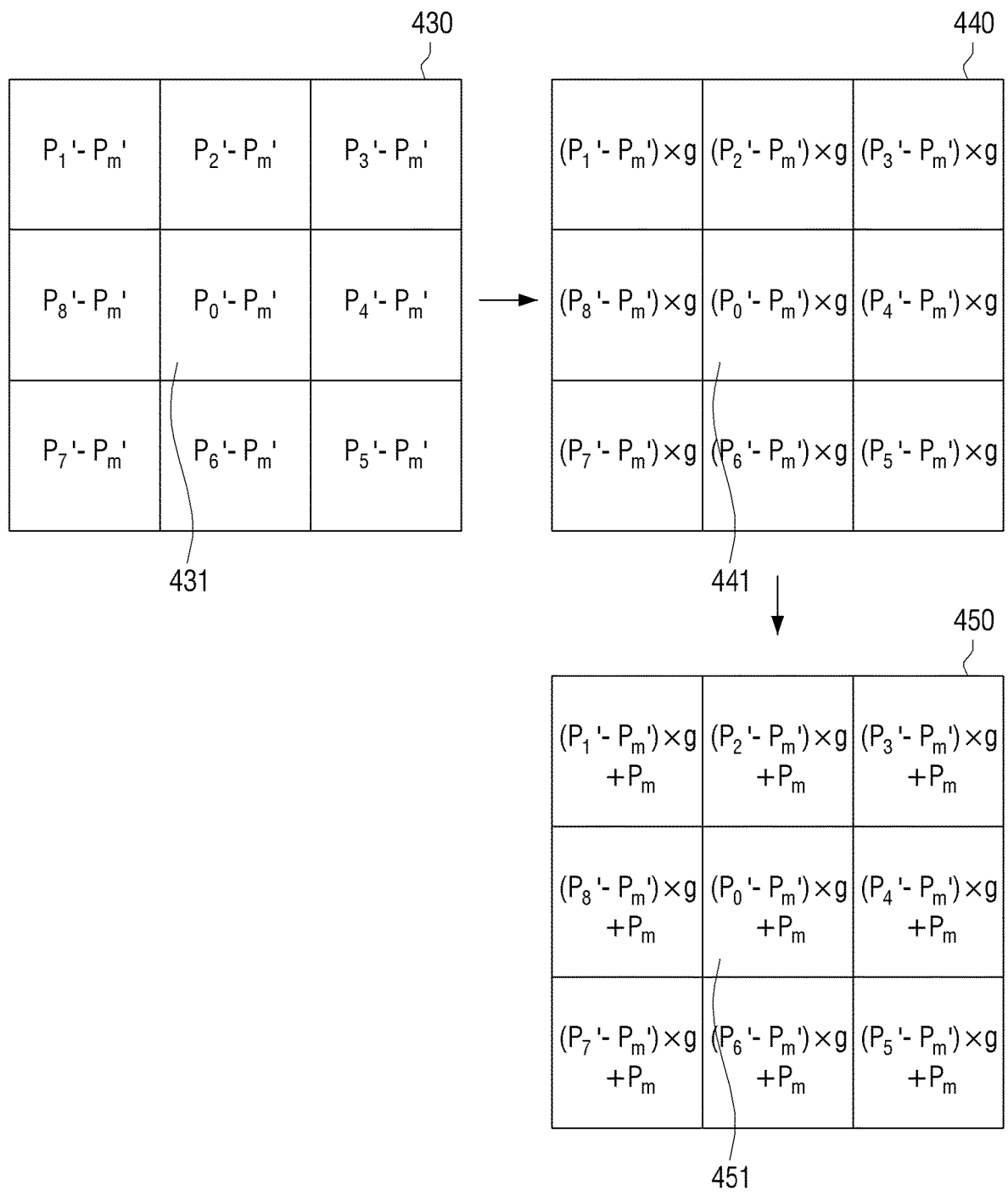
Figure 4C:
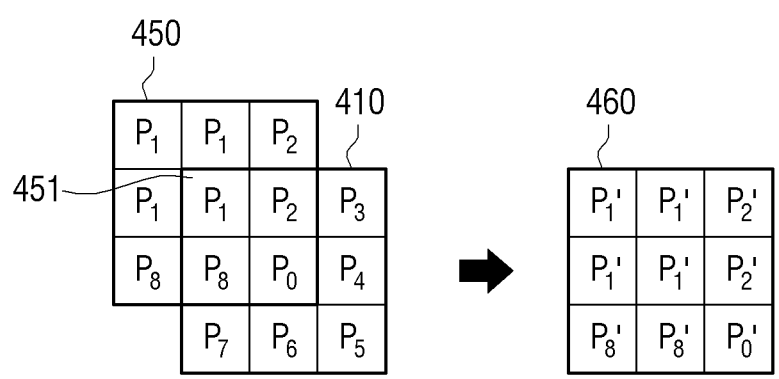

FIGS. 4A, 4B and 4C are diagrams illustrating a pixel value stretching method according to an embodiment of the present disclosure.

For example, as illustrated in FIG. 4A, a first pixel block 410 may be identified based on an object pixel 411 in an image (e.g., a compressed image), and a second pixel block 420 may be identified based on an object pixel 421 in a denoised image. The object pixel 421 of the denoised image may be disposed at the same position as the object pixel 411 of the input image.

A first mean value Pm for the pixel values included in the first pixel block 410 and a second mean value Pm' for the pixel values included in the second pixel block 420 may be obtained.

As illustrated in FIG. 4B, a third pixel block 430 may be obtained by subtracting the second mean value Pm' from each pixel value included in the second pixel block 420, and a fourth pixel block 440 may be obtained by multiplying each value included in the third pixel block 430 by the gain value g obtained according to an embodiment of the present disclosure.

An output pixel block 450 may be obtained by adding the first mean value Pm for the pixel value included in the first pixel block 410 to each value included in the fourth pixel block 440.

Such processing may be performed for each pixel value included in the pixel block as illustrated in FIGS. 4A and 4B, but when only the pixel value of the object pixel is used as the pixel value of the output image, the processing may be performed only for the object pixel 411. For example, an output pixel value 451 for the object pixel may be calculated by multiplying a value 431 obtained by subtracting the second mean value Pm' from an object pixel value $P_0$' 421 included in the second pixel block by the gain value g, and adding the second mean value Pm.

The processor 120 may perform image processing on a pixel disposed at the edge of the input image based on the mirrored pixel value. For example, if $P_1$ is a pixel disposed at the edge of the input image, the pixel values at the boundary of the first patch 410 may be mirrored by the processor 120 to generate a virtual patch 450 based on the pixel $P_1$ 451 to obtain a second patch 460 as illustrated in FIG. 4C, and to perform the processing in the same manner as described in FIGS. 4A and 4B.

Meanwhile, on the assumption that compression noise has a zero-mean, the gain value may not affect the noise component, and therefore performance may not be deteriorated in terms of noise reduction.

In addition, as described above, since an object pixel of the second patch, that is, a center pixel value is used for the output image, inconsistency with neighboring pixels and sudden characteristic change may not occur.

Figure 5A:
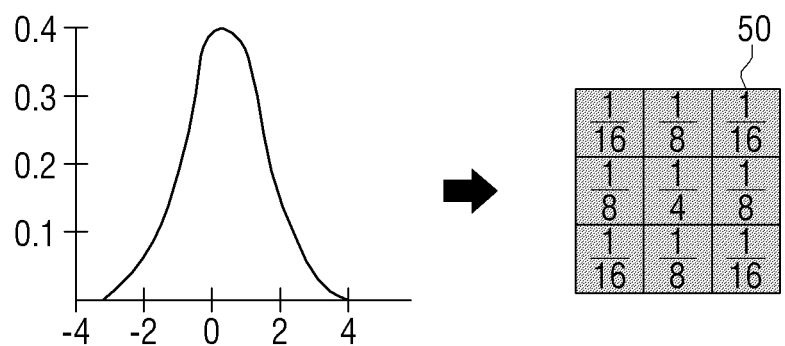
FIGS. 5A, 5B and 5C are diagrams illustrating a filtering method according to an embodiment of the present disclosure.

In some cases, it is possible to perform a Gaussian filtering process on the first pixel block 410 and the second pixel block 420, and perform the processing as described in FIGS. 4A and 4B. For example, as illustrated in FIG. 5A, the Gaussian filter may have a weighted value of 0 on the x-axis and a weighted value that is decreased toward +/− portion. When such the Gaussian filter is applied to a mask 50 of 3*3, the weight of the center of the mask 50 may be large, and the weight may be decreased toward the edge of the mask 50. However, it should be understood that FIG. 5A is an example, and filtering figures may vary depend on a sigma value of a Gaussian function.

Figure 5B:
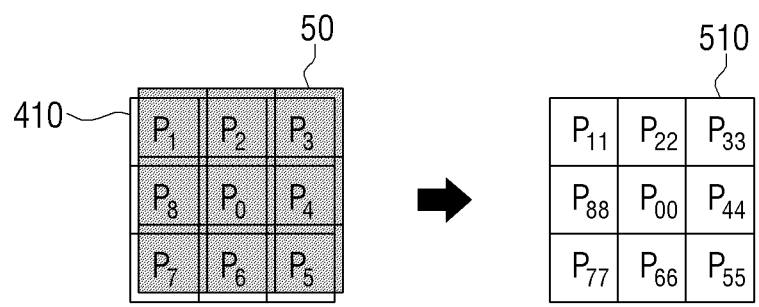
Figure 5C:
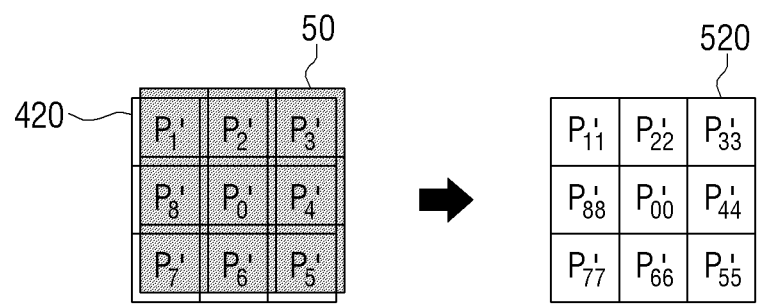

As illustrated in FIGS. 5B and 5C, the processor 120 may apply the Gaussian mask 50 to each pixel included value in the first patch 410 or the second patch 420, perform filtering, and then perform the processes shown in FIGS. 4A and 5B.

Figure 6A:
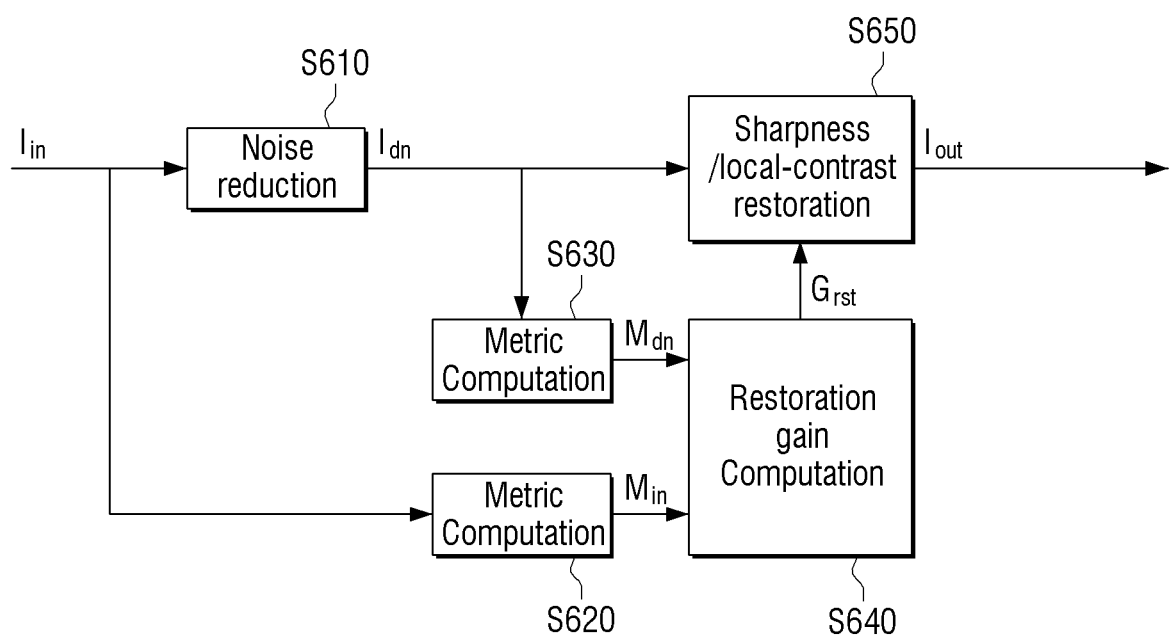
FIGS. 6A and 6B are block diagrams illustrating an image processing method according to various embodiments of the present disclosure.
Figure 6B:
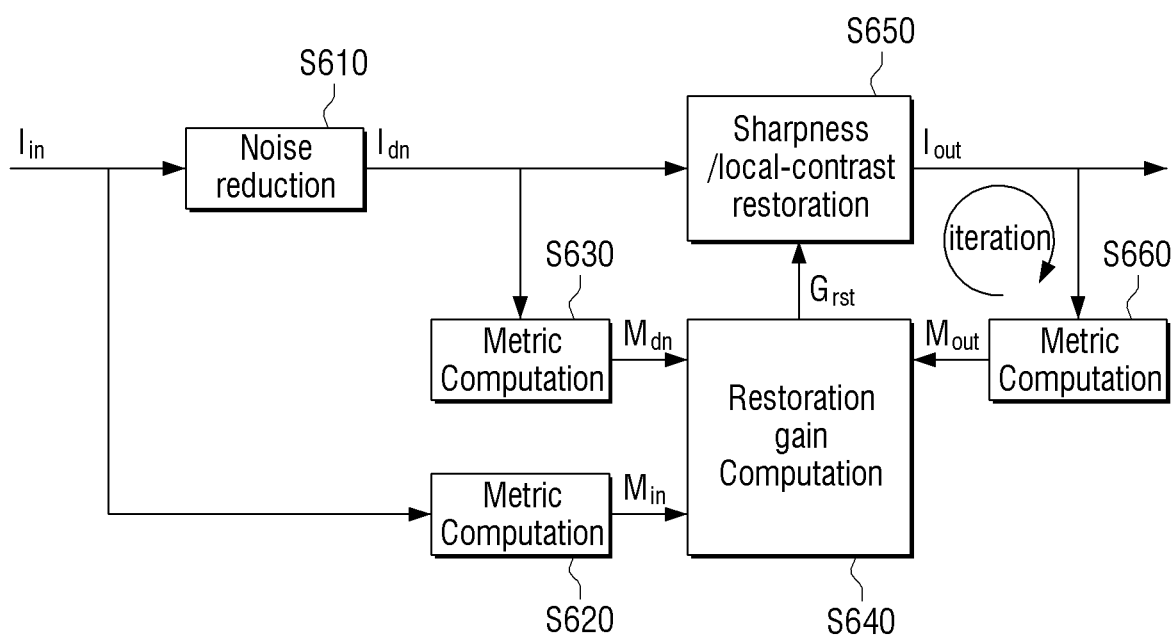

FIGS. 6A and 6B are block diagrams illustrating an image processing method according to various embodiments of the present disclosure.

As illustrated in FIG. 6A, a denoised image Idn may be obtained by performing a noise reduction process on an input image In, that is, a compressed image at step S610.

A first metric (Min) may be obtained based on the input image In at step S620, and a second metric (Mdn) may be obtained based on the denoised image Idn at step S630. For example, a first variance (or, a gradient) for a pixel value in the first pixel block identified in the input image In may be obtained, and a second variance (or, a gradient) for a pixel value in the second pixel block identified in the denoised image Idn may be obtained.

A gain value Grst may be obtained based on the first metric (Min) and the second metric (Mdn) at step S640. For example, a gain $$\sqrt{I_{input}^{var}(\bar{x}, \bar{y}) / I_{denoised}^{var}(\bar{x}, \bar{y})}$$

may be obtained based on a variance $I_{input}^{var}(\bar{x}, \bar{y})$ in the first block and a variance $I_{denoised}^{var}(\bar{x}, \bar{y})$ in the second block. For another example, a gain $I_{input}^{max,grad}(\bar{x}, \bar{y})/I_{denoised}^{max,grad}(\bar{x}, \bar{y})$ may be obtained based on the maximum gradient of the first pixel block $I_{input}^{max,grad}(\bar{x}, \bar{y})$ and the maximum gradient of the second pixel block $I_{denoised}^{max,grad}(\bar{x}, \bar{y})$.

The enhancement process may be performed by applying the obtained gain value Grst to the denoised image Idn at step S650 to provide output image $I_{out}$. For example, the gain $$\sqrt{I_{input}^{var}(\bar{x}, \bar{y}) / I_{denoised}^{var}(\bar{x}, \bar{y})}$$

may be applied to the texture region, and the gain $I_{input}^{max,grad}(\bar{x}, \bar{y})/I_{denoised}^{max,grad}(\bar{x}, \bar{y})$ may be applied to the edge region to perform the enhancement process.

As shown in FIG. 6B, it is possible to calculate an optimal gain value by repeating the process of recalculating a metric based on an output image Iout obtained by applying the gain value obtained at step S640 at step S660, and recalculating a gain value based on the recalculated metric.

<Gain Acquisition and Enhancement Processing According to Another Embodiment>

According to another embodiment, the processor 120 may calculate a gain for restoring the edge sharpness, which is blurred during the compression process of an image, and the lowered local contrast. In this case, an optimal gain according to a compression rate of an original image may be calculated and stored in the form of a table, and an enhancement process may be performed by using it. A method for calculating an optimal gain will be described below.

The processor 120 may calculate an optimal gain based on a maximum a posteriori (MAP) technique.

According to an embodiment, it is assumed that a compression artifact removal (CAR) technique is applied as a noise reduction process and an edge sharpness restoration (ESR) technique is applied as an enhancement process. In this case, an original image may be denoted by x, a compressed image may be denoted by y, a denoised image may be denoted by $\tilde{x}_{CAR}$, and an enhancement processed image may be denoted by $\tilde{x}_{ESR}$.

The processor 120 may obtain an optimal gain by using a maximum a posteriori (MAP) technique and an optimization technique. The MAP technique may be a technique of combining a given observation result with prior knowledge to determine an optimal parameter. Using the MAP technique, the optimal gain according to the compression rate of the original image may be calculated and stored in a table form, and the enhancement process may be performed using the table.

Figure 7:
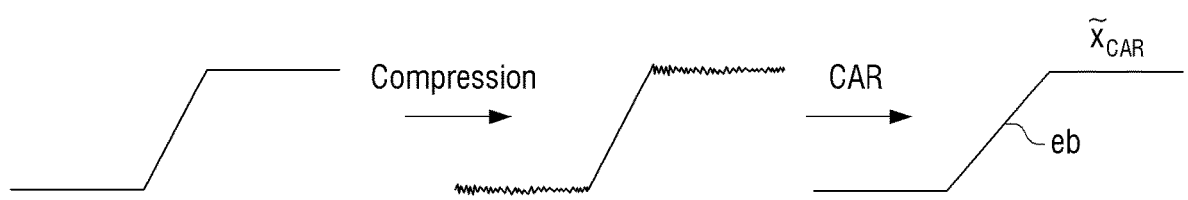
FIGS. 7, 8A, 8B, 9, 10, 11A, 11B, 12, 13A, 13B, 13C and 13D are diagrams illustrating another example embodiment of the present disclosure.

The processor 120 may perform modeling of $\tilde{x}_{CAR}$ where the compression noise is eliminated based on the MAP technique as shown in Equation 1 below.

$$\tilde{x}_{CAR} = x + e_b \quad \text{[Equation 1]}$$

Where x is an original image, that is, an image prior to compression; and $e_b$ is edge blur noise of an image where compression noise is eliminated, and has a Gaussian distribution. For example, as illustrated in FIG. 7, when the original image x is compressed, noise caused by compression may occur in a compressed image y. In addition, when compression noise reduction is performed on the compressed image y, edge blur noise may be generated in $\tilde{x}_{CAR}$ where the compression artifact removal process is performed, and this is denoted by $e_b$.

According to the MAP technique, $\tilde{x}_{ESR}$ where the edge is restored by the edge sharpness restoration process is modeled as shown in Equation 2 below.

$$\tilde{x}_{ESR} = \arg\max_x p(x|\tilde{x}_{CAR}) \quad \text{[Equation 2]}$$

Equation 2 is modified to Equation 3, by the Bayesian rule:

$$\tilde{x}_{ESR} = \arg\max_x (\log p(\tilde{x}_{CAR}|x) + \log p(x)) \quad \text{[Equation 3]}$$

Since the edge blur noise $e_b$ has a Gaussian distribution, the first part of Equation 3 is expressed by Equation 4 below.

$$\log p(\tilde{x}_{CAR} \mid x) = \frac{1}{2\sigma_b^2} \|x - \tilde{x}_{CAR}\|_2^2 \quad \text{[Equation 4]}$$

Where $\sigma_b^2$ is a variance of edge blur noise with a Gaussian distribution.

Figure 8A:
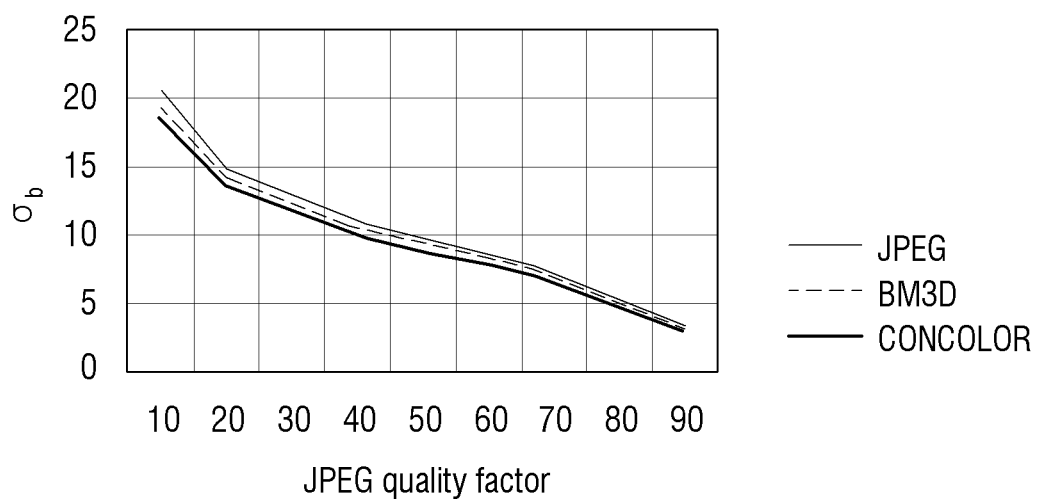

In order to estimate $\sigma_b^2$, for example, as shown in FIG. 8A, $\sigma_b$ may be calculated by changing JEPG Quality Factor.

Figure 8B:
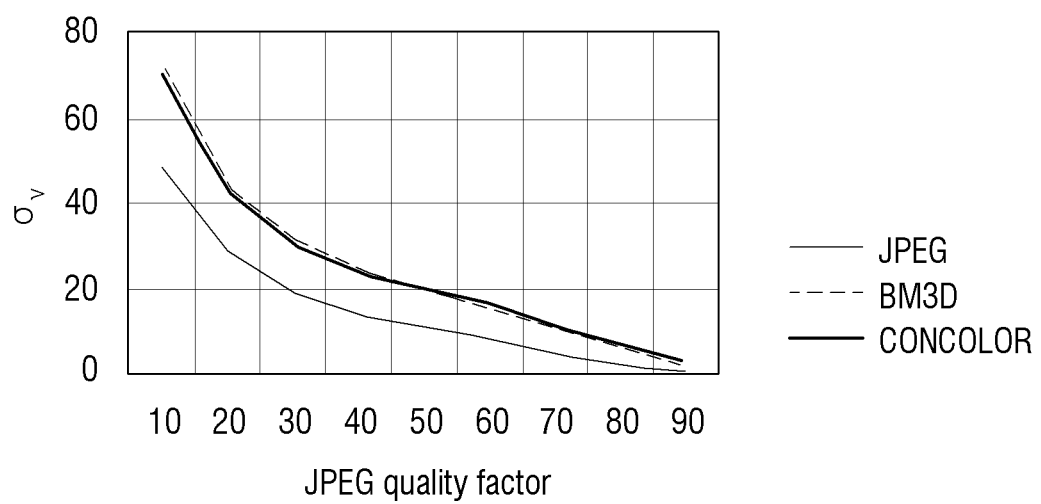
Figure 9:
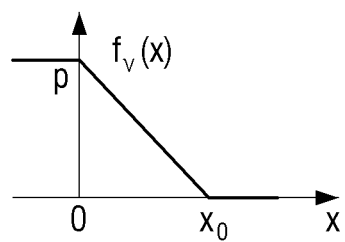

The edges blurred in the image compressed at a low bit rate may have a wider edge width. Accordingly, a variance of edges prior to compression may be greater than a variance of edges after compression. Accordingly, as shown in FIG. 8B, $\sigma_v^2$ may be calculated in the same manner as $\sigma_b^2$. In other words, the second part of Equation 3 is expressed by Equation 5 below using a function fv that has a smaller result value as the variance difference increases.

$$\log p(X) = -\frac{1}{2\sigma_v^2} \sum_{(i,j) \in \Omega f_v} (\text{var}(x_{(i,j)}) - \text{var}(\tilde{x}_{CAR(i,j)})) \quad \text{[Equation 5]}$$

Where $\sigma_v^2$ is a variance of an edge variance error with a Gaussian distribution. FIG. 9 is a diagram illustrating the form of the function fv according to an embodiment of the present disclosure.

Accordingly, formula for obtaining an optimal gain is expressed by Equation 6 below.

$$\tilde{x}_{ESR} = \arg\min_x \frac{1}{2\sigma_b^2} \|x - \tilde{x}_{CAR}\|_2^2 + \frac{1}{2\sigma_v^2} \sum_{(i,j) \in \Omega} f_v(\text{var}(x_{(i,j)}) - \text{var}(\tilde{x}_{CAR(i,j)})) \quad \text{[Equation 6]}$$

Where $\Omega$ is a pixel set corresponding to an edge region in an image.

According to an embodiment, the processor 120 may perform an unsharp masking (USM) process by applying a gain.

The processor 120 may perform the USM process based on Equation 7 below.

$$\hat{x} = \text{USM}(x,k) = x + k \cdot g(x) \quad \text{[Equation 7]}$$

Where k is an increase in sharpness, that is, a gain; r is a blur radius used to generate $x_{smooth}$; t is a threshold value of a minimum variance to which unsharp masking is applied; and g(x) is a high frequency component extracted by applying a smoothing filter. Herein, r and t are fixed values, but k is a variable value.

In other words, if a high-frequency component g(x) of an image is extracted, multiplied by a gain k, and then added, the edge sharpness may be enhanced.

Meanwhile, since k is iteratively obtained in the above-described manner, Equation 7 is modified to Equation 8 below.

$$\hat{x}^{(l)} = \text{USM}(\tilde{x}_{CAR}, k^{(l)}) \quad \text{[Equation 8]}$$

Where l denotes the number of iterations.

If the USM process is applied to a complex texture region in the compressed image, undesirable distortion may occur. If compression is performed at a lower bit rate, complex weak texture may be difficult to maintain. Conversely, the edge region having a simple structure and a large gradient may be more reliably sharpened and restored. Accordingly, the complex texture region may be detected by using a Laplacian filter, and the unsharp masking may be applied only to the edge region, except for the weak texture region, using an edge weight map $w_e$ as shown in Equation 9 below.

$$\hat{x}_{mix}^{(l)} = (1 - w_e) \cdot \tilde{x}_{CAR} + w_e \cdot \hat{x}^{(l)} \quad \text{[Equation 9]}$$

The edge weight map $w_e$ is expressed by Equation 10 as follow.

$$w_{e(i,j)} = \begin{cases} \frac{1}{\sigma_v}(\text{var}(x_{(i,j)}) - L_{smooth(i,j)}), & \text{if } EC_{(i,j)} \geq Thr \\ 0, & \text{else} \end{cases} \quad \text{[Equation 10]}$$

Where $L_{smooth}$ is a result of applying a smoothing filter after applying a Laplacian filter to $\tilde{x}_{CAR}$. That is, $L_{smooth}=|\text{LaplacianFilter}(\ )|*b$, and b is a blur kernel.

Figure 10:

FIG. 10 is a diagram illustrating the edge weight map $w_e$ according to an embodiment of the present disclosure.

In Equation 10, EC(i,j) is an edge correlation value and obtained by applying a step kernel S to the vertical and horizontal directions of the input image, as shown in Equation 11 below.

$$EC_{(i,j)} = \max(EC_{hor(i,j)}, EC_{ver(i,j)}) \quad \text{[Equation 11]}$$

$$EC_{hor[ver](i,j)} = \text{corr}(S, T_{hor[ver]}) = \frac{\text{cov}(S, T_{hor[ver]})}{\sigma_S \cdot \sigma_{T\ hor[ver]}}$$

Where $T_{hor}$ and $T_{ver}$ denote n pixel sets in the vertical and horizontal directions based on a pixel(i,j).

Figure 11A:
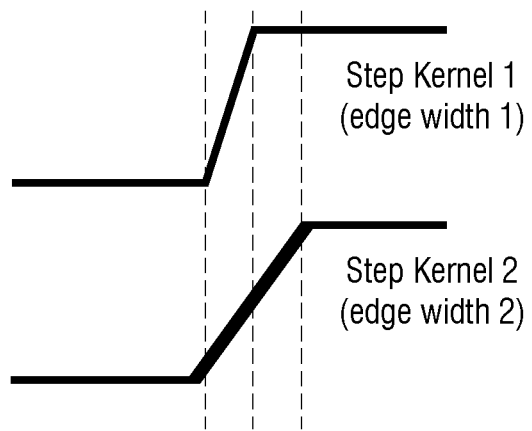
Figure 11B:
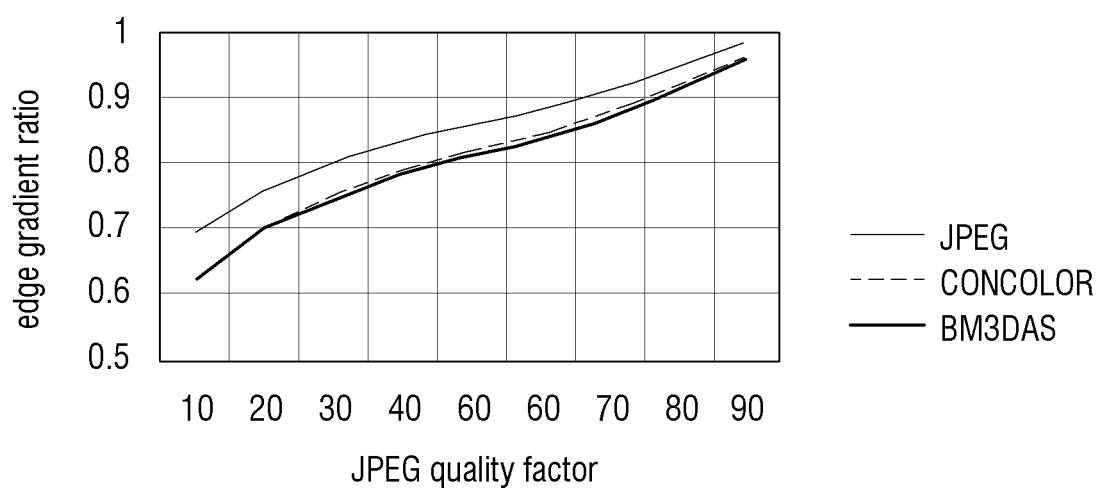

FIG. 11A is a diagram illustrating an example of the step kernel S according to an embodiment of the present disclosure, and FIG. 11B shows that an edge gradient of an input image is reduced as JEPG quality factor is reduced.

Side effects such as undershoot and overshoot may occur to $\hat{x}_{mix(i,j)}^{(l)}$ where the unsharp masking is applied to the edge. It is possible to obtain a minimum pixel value and a maximum pixel value of a neighboring pixel as shown in Equation 12, and adjust a pixel value not to exceed or fall below the corresponding values.

$$x_{(i,j)}^{(l)} = \begin{cases} I_{min(i,j)}, & \text{if } \hat{x}_{max(i,j)}^{(l)} < I_{min(i,j)} \\ \hat{x}_{mix(i,j)}^{(l)}, & \text{if } I_{min(i,j)} < \hat{x}_{mix(i,j)}^{(l)} < I_{max(i,j)} \\ I_{max(i,j)}, & \text{if } \hat{x}_{mix(i,j)}^{(l)} > I_{max(i,j)} \end{cases} \quad \text{[Equation 12]}$$

Figure 12:
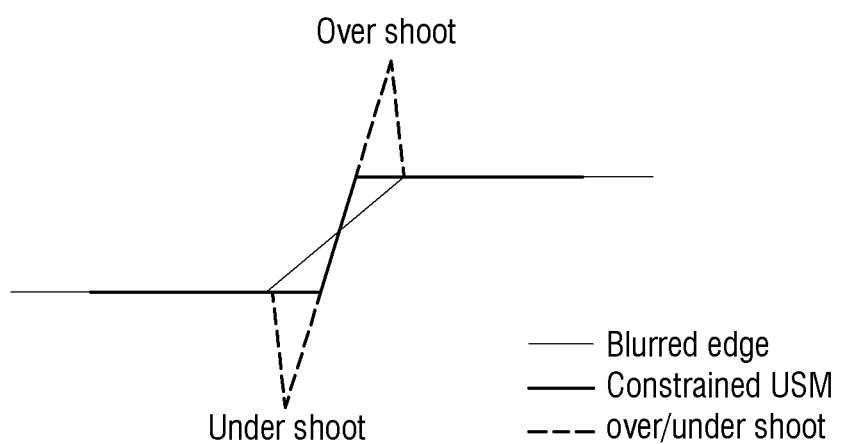

FIG. 12 is a diagram illustrating an example of increasing the edge sharpness without overshoot and undershoot according to an embodiment of the present disclosure.

Figure 13A:
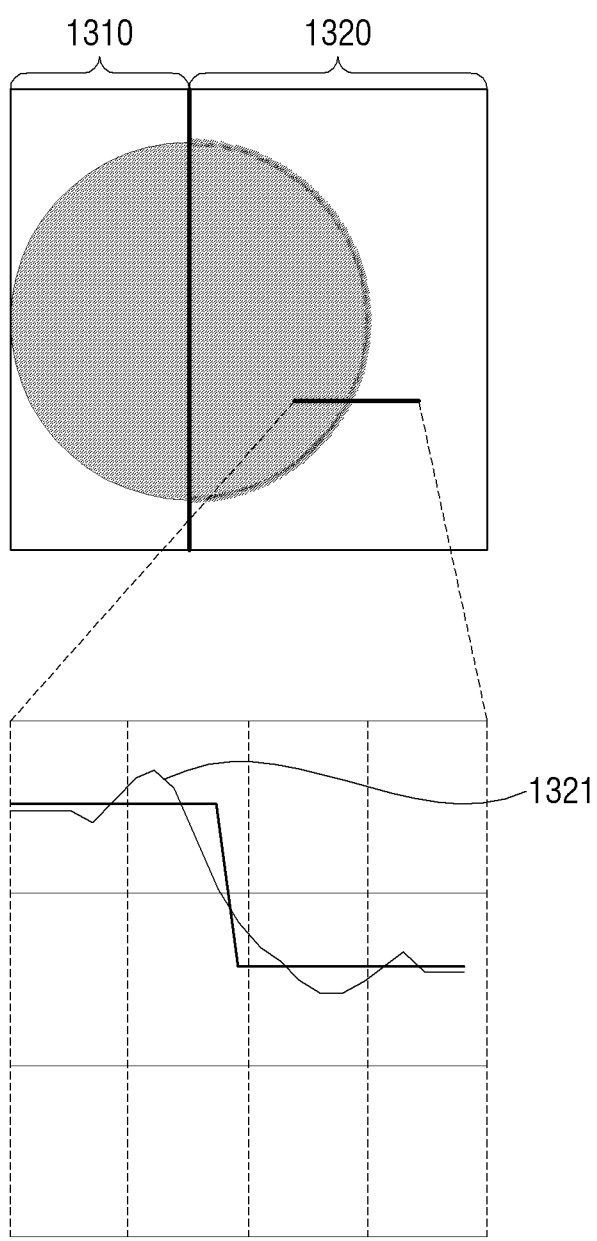

For example, as shown in FIG. 13A, ringing, mosquito and edge blur phenomenon may occur in a compressed image 1320 by compressing an original image 1310 (1321). For ease of explanation, FIGS. 13A to 13D illustrate an image input (e.g., the original image 1310) on the left side and an image processed at each step on the right side.

Figure 13B:
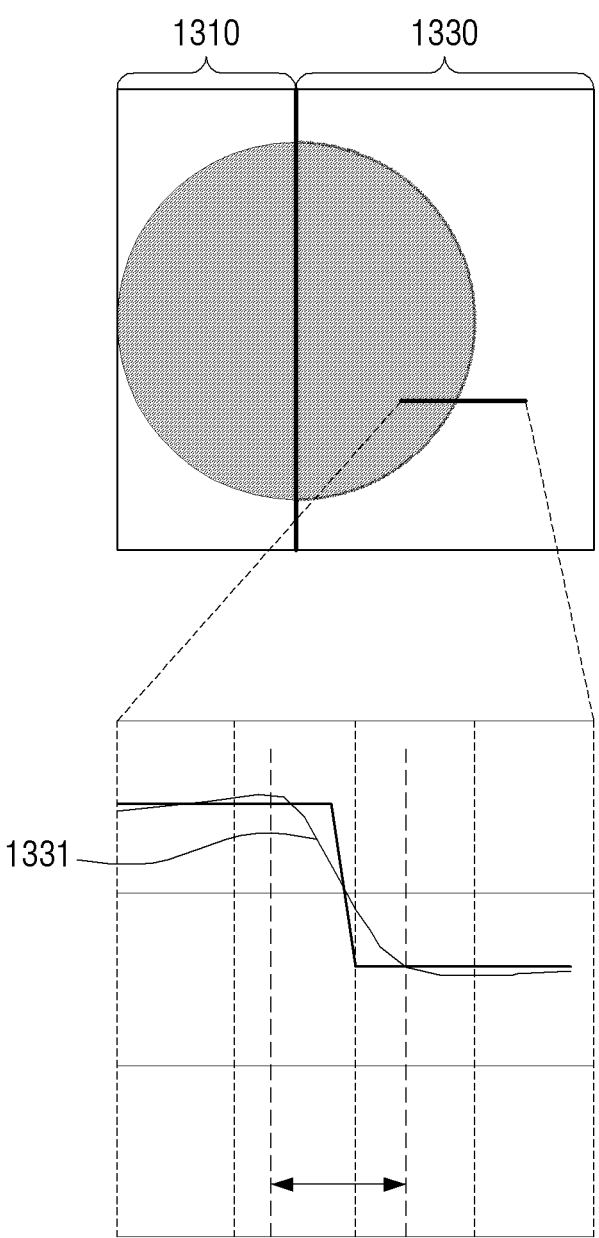

When a noise reduction process is performed in the compressed image 1320, as shown in FIG. 13B, in an image 1330 where the noise reduction process is performed, ringing and mosquito noise may be eliminated, but the edge blur phenomenon may still remain (1331).

Figure 13C:
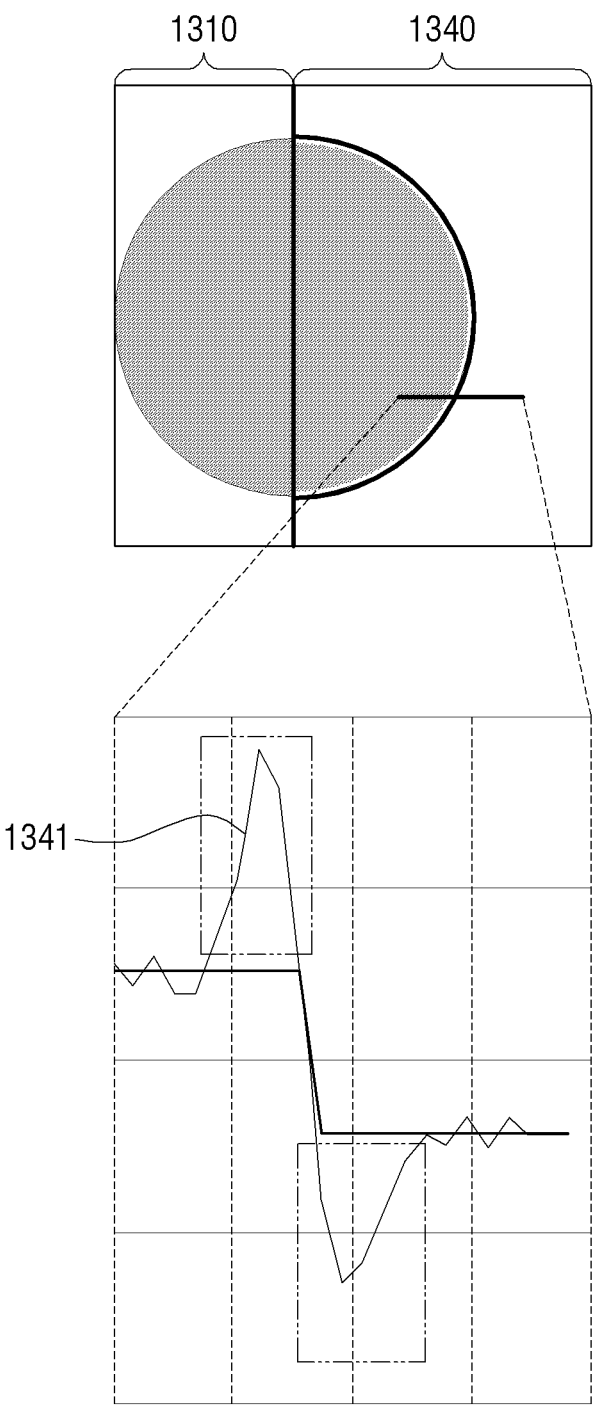

When the edge sharpness is enhanced by applying k calculated by using the optimization technique of the present disclosure to the image 1330 where the noise reduction process is performed, as shown in FIG. 13C, overshoot/undershoot may occur in an image 1340 (1341).

Figure 13D:
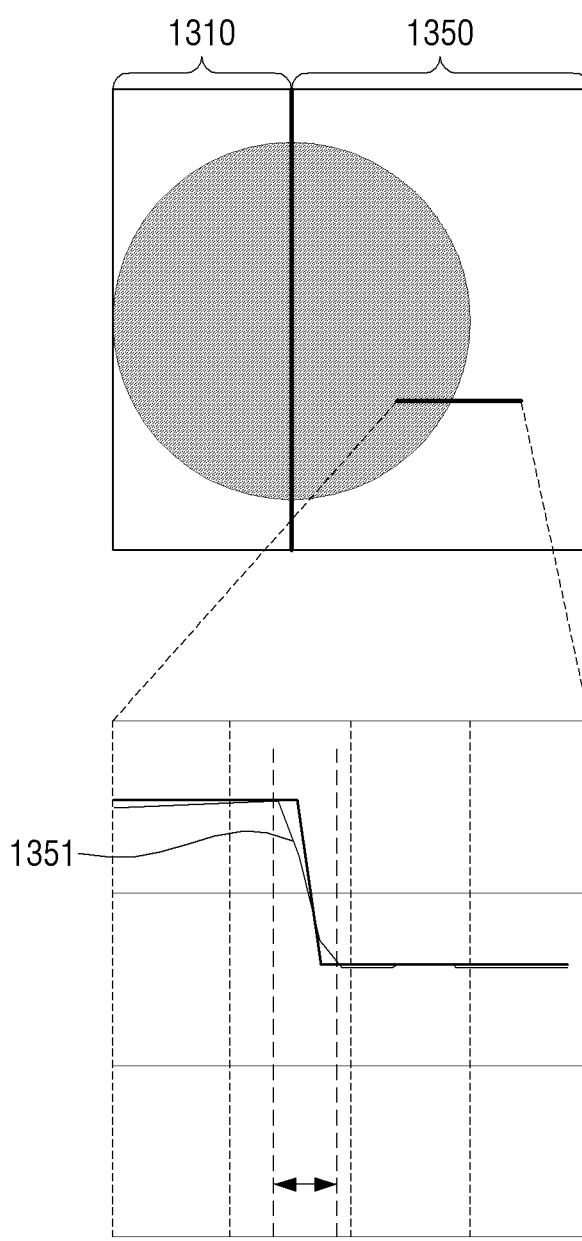

Accordingly, by way of using the minimum pixel value and the maximum pixel value according to Equation 12, as shown in FIG. 13D, the edge sharpness may be restored in an image 1350 without overshoot/undershoot (1351).

The processor 120 may obtain an optimal gain according to a compression rate by applying the optimization technique based on Equations 6 and 12. Examples of the optimization technique may include a gradient decent technique.

The processor 120 may obtain the optimal gain according to each compression rate and store the obtained gain in the form of a look-up table. The processor 120 may obtain a corresponding gain from the look-up table based on the compression rate of the input image, and perform an enhancement process based on the obtained gain.

FIG. 14 is a table illustrating a quantitative effect according to another embodiment of the present disclosure.

FIG. 14 shows the change of PSNR after quality factor (QF) for each of eight images is JPEG compressed at 10 and 20. When QF is 10, the PSNR (peak signal-to-noise ratio) may be improved by 2.81 dB at most by eliminating noise using CONCOLOR, and when QF is 20, the PSNR may be improved by 2.95 dB at most by eliminating noise. When the edge sharpness restoration result (CONCOLOR+edge sharpness restoration) is QF 10, the PSN may be improved by 0.42 dB at most, and when the edge sharpness restoration result (CONCOLOR+edge sharpness restoration) is QF 20, the PSNR may be improved by 0.46 dB at most.

Figure 15:
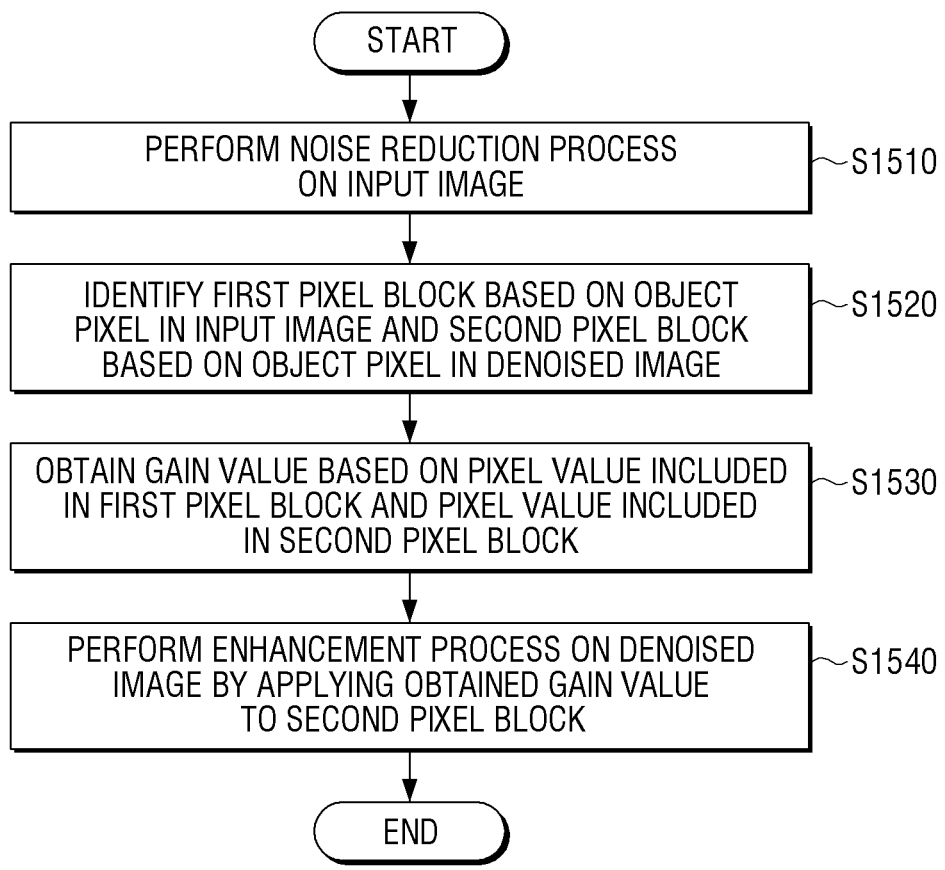
FIG. 15 is a flowchart illustrating an image processing method according to an embodiment of the present disclosure.

FIG. 15 is a flowchart illustrating an image processing method according to an embodiment of the present disclosure.

Referring to FIG. 15, a noise reduction process may be performed on an input image at step S1510.

A first pixel block may be identified based on an object pixel in the input image, and a second pixel block may be identified based on an object pixel in the denoised image at step S1520.

A gain value may be obtained based on a pixel value included in the first pixel block and a pixel value included in the second pixel block at step S1530.

The enhancement process may be performed on the denoised image by applying the obtained gain value to the second pixel block at step S1540.

At step of S1530, a gain value may be obtained based on a variance on the pixel value included in the first pixel block and a variance on the pixel value included in the second pixel block.

At step of S1530, a gain value may be obtained based on a gradient on the pixel value included in the first pixel block and a gradient on the pixel value included in the second pixel block.

At step of S1530, when a first pixel block is included in the texture region of the input image, a gain value may be obtained based on a variance on the pixel value included in the first pixel block, and a variance on the pixel value included in the second pixel block. In addition, when the first pixel block is included in the edge region of the input image, a gain value may be obtained based on a gradient on the pixel value included in the first pixel block and a gradient on the pixel value included in the second pixel block.

At step of S1540, the enhancement process on the denoised image may be performed based on the pixel value included in the second pixel block, a first mean value on the pixel value included in the first pixel block, and a second mean value on the pixel value included in the second pixel block, and the gain value.

At step of S1540, the enhancement process on the denoised image may be performed by subtracting the second mean value from each pixel value included in the second pixel block, multiplying by the gain value and adding the first mean value.

At step of S1540, the enhancement process on the denoised image may be performed by obtaining a pixel value of an object pixel from the second pixel block, subtracting the second mean value from the obtained pixel value, multiplying by the gain value, and adding the first mean value.

At step of S1540, the enhancement process may be performed by applying at least one of unsharp masking and pixel value stretching.

Figure 16:
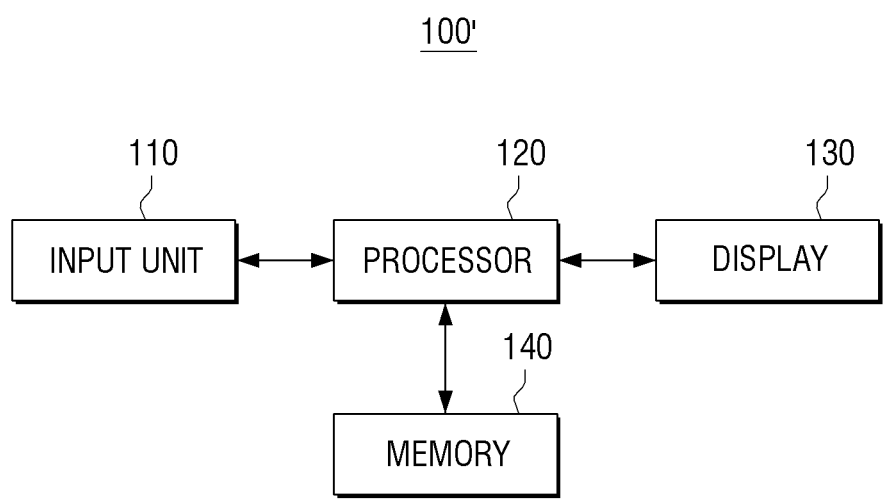
FIG. 16 is a block diagram illustrating an example configuration of an image processing apparatus according to another embodiment of the present disclosure.

FIG. 16 is a block diagram illustrating an example image processing apparatus according to another embodiment of the present disclosure.

Referring to FIG. 16, an image processing apparatus 100' may include an input unit (e.g., including input circuitry) 110, a processor (e.g., including processing circuitry) 120, a display 130 and a memory 140. A detailed description of the configuration shown in FIG. 2 will not be repeated here.

The display 130 may be embodied in various forms such as, for example, and without limitation, liquid crystal display (LCD), organic light-emitting diode (OLED), liquid crystal on silicon (LCoS), digital light processing (DLP), quantum dot (QD) display panel, etc.

The processor 120 may include various processing circuitry, such as, for example, and without limitation, a CPU, a ROM (ROM or non-volatile memory) storing a control program for controlling the image processing apparatus 100', and a storage unit for storing data input from the outside of the image processing apparatus 100' (RAM, or volatile memory) used as a storage area corresponding to various operations performed in the image processing apparatus 100'.

The CPU may access at least one memory 140, and perform various operations by using various programs, contents, data, etc.

The memory 140 may be embodied as an internal memory such as ROM, RAM, etc. included in the processor 120, or embodied as a memory separated from the processor 120. The memory 140 may be embodied as a memory embedded in the electronic apparatus 100' according to data storage purpose, or embodied as a memory that can be detachably attached to the electronic apparatus 100'. For example, data for driving the electronic apparatus 100' may be stored in a memory embedded in the electronic apparatus 100', and data for an expansion function of the electronic apparatus 100 may be stored in a memory that can be detachably attached to the electronic apparatus 100'. A memory embedded in the electronic apparatus 100' may be implemented as a nonvolatile memory, a volatile memory, a hard disk drive (HDD), or a solid state drive (SSD), and a memory that can be detachably attached to a display apparatus 200 may be implemented as a memory card (e.g., a micro SD card, a USB memory, etc.), an external memory that can be connected to a USB port (e.g., a USB memory), and the like. According to an embodiment, the memory 140 may be embodied as an internal memory of the processor 120, and in this case, embodied as N lint memory depending on hardware memory capacity limit.

The image processing apparatus 100' may further include an output unit (not shown) for outputting a sound signal and a user interface (not shown) for receiving a user command.

According to various embodiments of the present disclosure, edge sharpness and/or local contrast reduced by image compression, noise reduction processing, etc. may be enhanced.

However, various embodiments of the present disclosure are not limited to an image processing apparatus, but the present disclosure may be embodied as an image receiving apparatus such as, for example, and without limitation, a set-top box, all types of electronic apparatuses cable of image processing, for example, a display apparatus such as a TV.

The various embodiments described above may be implemented in a recording medium that can be read by a computer or a similar device using software, hardware, or a combination thereof. In some cases, the embodiments described herein may be implemented by the processor 120 itself. According to a software implementation, embodiments such as the procedures and functions described herein may be implemented in separate software modules. Each of the software modules may perform one or more of the functions and operations described herein.

Meanwhile, computer instructions for performing the processing operations of the image processing apparatus 100 according to various embodiments of the present disclosure described above may be stored in a non-transitory computer-readable medium. Computer instructions stored on such non-volatile computer-readable media may cause a particular device to perform processing operations of the image processing apparatus 100 according to various embodiments described above when executed by a processor.

The non-transitory computer readable medium refers to a medium that stores data semi-permanently, such as a register, a cache, and a memory, and is readable by an apparatus. For example, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although various example embodiments have been illustrated and described, it will be appreciated by those skilled in the art that changes may be made to these example embodiments without departing from the principles and spirit of the present disclosure. Accordingly, the scope of the present disclosure is not to be understood as being limited to the described example embodiments, but is defined by the appended claims as well as equivalents thereto.

What is claimed is:

1. An image processing apparatus, comprising:
an input unit comprising input circuitry; and
a processor configured to:
perform a noise reduction process on an image input through the input unit,
identify a first pixel block based on an object pixel in the input image,
identify a second pixel block based on the object pixel in a denoised image obtained by the noise reduction process,
obtain a gain value based on a pixel value included in the first pixel block and a pixel value included in the second pixel block, and
perform an enhancement process on the denoised image by processing each pixel included in the second pixel block based on the pixel value included in the second pixel block, a first mean value for the pixel value included in the first pixel block, a second mean value for the pixel value included in the second pixel block, and the obtained gain value,
wherein a metric of the input image is preserved after performing the enhancement process.

2. The image processing apparatus as claimed in claim 1, wherein the processor is further configured to obtain the gain value based on a variance for the pixel value included in the first pixel block, and a variance for the pixel value included in the second pixel block.

3. The image processing apparatus as claimed in claim 1, wherein the processor is further configured to obtain the gain value based on a gradient for the pixel value included in the first pixel block, and a gradient for the pixel value included in the second pixel block.

4. The image processing apparatus as claimed in claim 1, wherein the processor is further configured to:
- obtain the gain value based on a variance for the pixel value included in the first pixel block and a variance for the pixel value included in the second pixel block based on the first pixel block being included in a texture region of the input image, and
- obtain the gain value based on a gradient for the pixel value included in the first pixel block and a gradient for the pixel value included in the second pixel block based on the first pixel block being included in an edge region of the input image.

5. The image processing apparatus as claimed in claim 1, wherein the enhancement process on the denoised image is configured to be performed by subtracting the second mean value from each pixel value included in the second pixel block, multiplying each pixel value included in the second pixel block from which the second mean value is subtracted by the gain value, and adding the first mean value to each pixel value multiplied by the gain value.

6. The image processing apparatus as claimed in claim 1, wherein the enhancement process on the denoised image is configured to be performed by obtaining a pixel value of the object pixel from the second pixel block, subtracting the second mean value from the obtained pixel value, multiplying the pixel value of the obtained pixel value less the second mean value by the gain value, and adding the first mean value to the pixel value multiplied by the gain value.

7. The image processing apparatus as claimed in claim 1, wherein the processor is further configured to perform the enhancement process by applying at least one of: unsharp masking and pixel value stretching.

8. The image processing apparatus as claimed in claim 1, further comprising:
- a display,
- wherein the processor is further configured to control the display to display the enhancement processed image.

9. An image processing method for an image processing apparatus, the method comprising:
- performing a noise reduction process on an input image;
- identifying a first pixel block based on an object pixel in the input image;
- identifying a second pixel block based on the object pixel in a denoised image obtained by the noise reduction process;
- obtaining a gain value based on a pixel value included in the first pixel block and a pixel value included in the second pixel block; and
- performing an enhancement process on the denoised image comprising processing each pixel included in the second pixel block based on at least the pixel value included in the second pixel block, a first mean value for the pixel value included in the first pixel block, a second mean value for the pixel value included in the second pixel block, and the obtained gain value,
- wherein a metric of the input image is preserved after performing the enhancement process.

10. The method as claimed in claim 9, wherein the obtaining of the gain value comprises obtaining the gain value based on a variance for the pixel value included in the first pixel block, and a variance for the pixel value included in the second pixel block.

11. The method as claimed in claim 9, wherein the obtaining of the gain value comprises obtaining the gain value based on a gradient for the pixel value included in the first pixel block, and a gradient for the pixel value included in the second pixel block.

12. The method as claimed in claim 9, wherein the obtaining of the gain value comprises:
- obtaining the gain value based on a variance for the pixel value included in the first pixel block and a variance for the pixel value included in the second pixel block, based on the first pixel block being included in a texture region of the input image and
- obtaining the gain value based on a gradient for the pixel value included in the first pixel block and a gradient for the pixel value included in the second pixel block based on the first pixel block being included in an edge region of the input image.

13. The method as claimed in claim 9, wherein the performing of the enhancement process comprises performing an enhancement process on the denoised image by subtracting the second mean value from each pixel value included in the second pixel block, multiplying each pixel value included in the second pixel block from which the second mean value is subtracted by the gain value, and adding the first mean value to each pixel value multiplied by the gain value.

14. The method as claimed in claim 9, wherein the performing of the enhancement process comprises performing an enhancement process on the denoised image by obtaining a pixel value of the object pixel of the second pixel block, subtracting the second mean value from the obtained pixel value, multiplying the pixel value of the obtained pixel value less the second mean value by the gain value, and adding the first mean value to the pixel value multiplied by the gain value.

15. The method as claimed in claim 9, wherein the performing of the enhancement process comprises performing the enhancement process by applying at least one of: unsharp masking and pixel value stretching.

16. The method as claimed in claim 9, further comprising: displaying the enhancement processed image.

17. A non-transitory computer readable medium having stored thereon a computer command which, when executed by a processor, causes an electronic apparatus to perform operations, wherein the operations comprise:
- performing a noise reduction process on an input image;
- identifying a first pixel block based on an object pixel in the input image;
- identifying a second pixel block based on the object pixel in a denoised image;
- obtaining a gain value based on a pixel value included in the first pixel block and a pixel value included in the second pixel value; and
- performing an enhancement process on the denoised image comprising processing each pixel included in the second pixel block based on the pixel value included in the second pixel block, a first mean value for the pixel value included in the first pixel block, a second mean value for the pixel value included in the second pixel block, and the obtained gain value,
- wherein a metric of the input image is preserved after performing the enhancement process.

18. The non-transitory computer readable medium of claim 17, wherein the enhancement process on the denoised image is performed based on the pixel value included in the second pixel block, a mean value for the pixel value included in the second pixel block, and the gain value.

* * * * *